O. L. McCORMICK.
VULCANIZER'S DIE FOR PRESERVING ANTISKID TIRE TREADS.
APPLICATION FILED MAR. 20, 1919.
1,338,233. Patented Apr. 27, 1920.
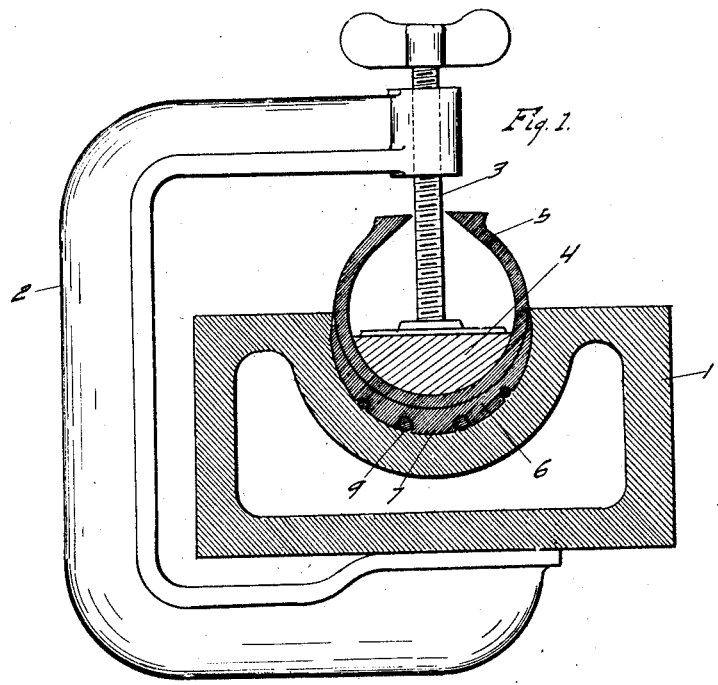
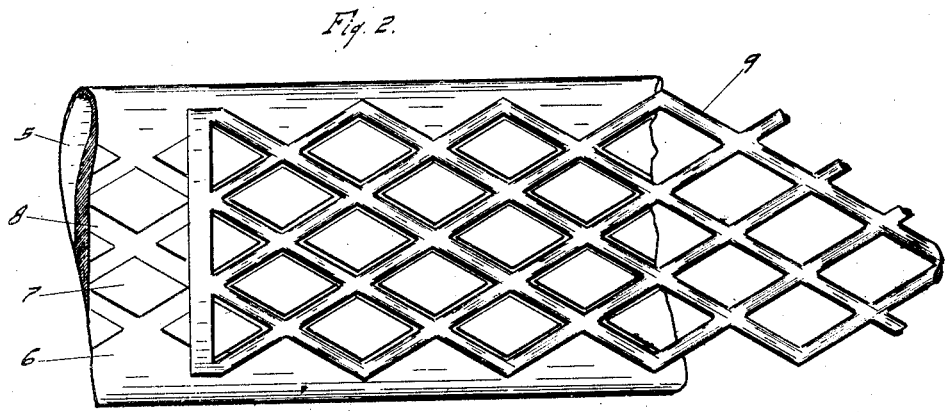

UNITED STATES PATENT OFFICE.

OSCAR L. McCORMICK, OF BIRMINGHAM, ALABAMA.

VULCANIZER'S DIE FOR PRESERVING ANTISKID TIRE-TREADS.

1,338,233.

Specification of Letters Patent.    Patented Apr. 27, 1920.

Application filed March 20, 1919.   Serial No. 283,890.

*To all whom it may concern:*

Be it known that I, OSCAR L. MCCORMICK, a citizen of the United States of America, residing at Birmingham, in the county of Jefferson and State of Alabama, have invented certain new and useful Improvements in Vulcanizers' Dies for Preserving Antiskid Tire-Treads, of which the following is a specification.

My invention relates to a vulcanizer's die or form for preserving the anti-skid tread surface of automobile and truck tires during repairs on the same involving vulcanization.

Heretofore where it has been necessary to revulcanize a portion of the tread of an anti-skid tire in making repairs thereon, the action of the vulcanizing apparatus on the deformed surface of the anti-skid tread has been to flatten or smooth out the latter, substantially or totally destroying its anti-skid features or design and leaving that portion of the tire defaced that was in the vulcanizing apparatus. This result has been of peculiar disadvantage in the case of blow out repairs on practically new tires resulting from unusual punctures or from some inherent defect in the tire. Heretofore solid dies have been used originally to manufacture the anti-skid design for tire treads and it has not been considered practical or feasible to utilize such dies for repair jobs not only because of the cost of the same but also because of the difficulty in fitting the solid die to the anti-skid tread design.

The purpose of my invention is to devise a simple and inexpensive die or shaper which can be formed of open work metal having a design corresponding to that of the depressions in the anti-skid tread to be repaired and this open work die or former can be readily adjusted in proper position in the depressed parts of the tire tread and held in this position until the tire is set down into the vulcanizing mold and there clamped in position. These dies can be stamped or pressed in any well known manner from sheets flexible enough to conform themselves readily to the shape of the tire and to the mold, and being inexpensive and easily applied will enable the vulcanizer to preserve the anti-skid tread design and avoid defacing the tire.

As illustrative of the preferred embodiments only of my invention reference is made to the accompanying drawings which form a part of this specification, and in which:—

Figure 1 is a vertical sectional view through a vulcanizing repair outfit showing an anti-skid tire with my tread preserving die in place during the vulcanization of the tire.

Fig. 2 is a plan view of a section of a typical anti-skid tire tread having my tread preserving die or former applied thereto preparatory to inserting the tire in the mold.

Similar reference numerals refer to similar parts throughout the drawings.

I have illustrated my invention in connection with a typical vulcanizing repair apparatus comprising a mold 1 having a clamp 2 and a press screw 3 engaging a presser head 4 which is adapted to be inserted into the tire 5 and to press the tread of the latter against the mold which is heated internally in any suitable manner. The tire 5 is typical of any anti-skid tire having its tread surface 6 formed with diamond shaped projections 7 separated by intersecting grooves or channels 8. This design is typical of the Goodyear tire but it is understood that my invention is adapted for use with any type of anti-skid tire. My tread preserving die 9 as designed for use with the anti-skid tire illustrated is formed of metal punched, pressed, shaped or formed by any suitable mechanical process so as to form a skeleton or open work design corresponding in shape to the grooves or depressions in the anti-skid tire tread. The die being open can be readily applied to the portion of the tire to be vulcanized and fitted into the grooves or depressions between the raised portions of the tread and while held in this position the tire with the die in place is inserted into the vulcanizing mold and securely clamped in position therein and while thus held the vulcanization takes place, after which the tire is removed and the die stripped from the tire leaving the peculiar anti-skid tread design of the tire perfectly protected and uninjured by the vulcanization process.

Wherever it is possible it is desirable for the die or former to be of open work construction but some anti-skid treads are so designed that this is possible only to a partial extent and in this case the die is preferably formed of light flexible sheet metal stamped to provide raised projections conforming to the depressions in the tread and having sufficient openings by which it can be readily brought into proper position on the tire preparatory to vulcanization.

I do not desire to be limited to any particular material or method of manufacture for the production of these tread preserving dies but prefer a flexible metal die and would regard it advantageous that the latter can be flattened or nested for compact shipment.

This invention is not intended to be restricted in scope to the specific embodiment shown, but contemplates such modifications as come within the spirit and scope of the claims.

Having thus described my invention, what I claim as new and desire to secure by Letters Patent, is:—

1. A repair die for vulcanizing anti-skid tire treads consisting of a short flexible metallic die having raised portions complementary to the depressed portions of the anti-skid tread and provided with sight openings to adapt it to be fitted into said depressed portions and to overlie the portion of the tire to be vulcanized prior to its introduction into the vulcanizing apparatus.

2. In a tire repair device of the character described, an open work die comprising raised portions complementary to the depressions in the anti-skid tire tread portion to be vulcanized.

In testimony whereof I affix my signature.

OSCAR L. McCORMICK.

Witness:
NOMIE WELSH.